Nov. 16, 1965  C. FULOP  3,217,583
UNITARY EXPANSION ANCHOR FOR BOLTS
Filed May 21, 1964  2 Sheets-Sheet 1

INVENTOR.
CHARLES FULOP
BY
*Sanford Schnurmacher*
ATTORNEY.

Nov. 16, 1965 C. FULOP 3,217,583
UNITARY EXPANSION ANCHOR FOR BOLTS
Filed May 21, 1964 2 Sheets-Sheet 2

INVENTOR.
CHARLES FULOP
BY
ATTORNEY.

United States Patent Office 3,217,583
Patented Nov. 16, 1965

3,217,583
UNITARY EXPANSION ANCHOR FOR BOLTS
Charles Fulop, 131 Skyview Drive,
Seven Hills Village, Ohio
Filed May 21, 1964, Ser. No. 370,399
1 Claim. (Cl. 85—72)

This application is a continuation-in-part of my application Serial No. 162,105, filed December 26, 1961, entitled Unitary Expansion Anchor for Bolts which is now abandoned.

This invention relates to driven, headed and screw-threaded fastenings, and particularly to a one-piece expandible device for anchoring bolts in smooth-walled blind holes.

Conducive to a better understanding of this invention, it may be well to point out that so-called expansion bolts commonly comprise a bolt retaining shield which is inserted in a pre-drilled hole and then expanded into locked engagement with the hole wall by means of a tapered expansion element.

Such tapered elements are made as a separate piece which must be inserted into the shield at the time of manufacture.

Furthermore, there is the possibility that the expander element may become separated from the shield and be lost, thereby rendering the whole item useless.

Again, the formation of two separate elements, and their subsequent assembly, greatly increases the cost of production.

The primary object of this invention, therefore, is to provide a unitary expansion anchor, for securing bolts in blind holes, that may be fabricated from a single length of bar stock.

Another object is to provide a device of the type stated that remains a single piece until the moment of its ultimate use, at which time it becomes a two-piece device.

Another object is to provide such a device whose expander element is attached to the anchor through a frangible wall that may be shattered by a single blow, thereby enabling the separated parts to be telescoped relative each other to expand the anchor into wedged engagement with the walls of the blind hole in which it is seated.

Still another object is to provide a device of the type stated whose tapered expander element has a leading, right cylindrical, plug portion that fits the bore of its mating sleeve in a force fit, over its entire surface, and not just in point contact as occurs between the tapered portion and the sleeve, to provide a positive, vibration proof, lock between the expanded sleeve and the expander element.

A further object is to provide a unitary anchor that is simple to manufacture, that requires no assembling operation, and little or no skill for its installation.

These and other objects of the invention will become apparent from a reading of the following specification and claim, together with the accompanying drawing, wherein like parts are referred to and indicated by like reference numerals, and wherein:

Figure 4:
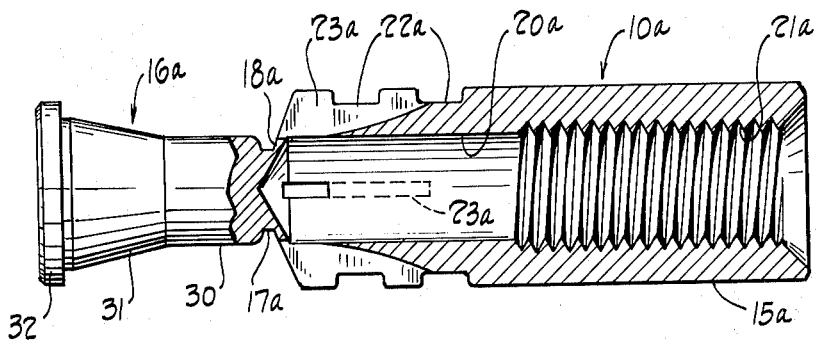
Figure 5:
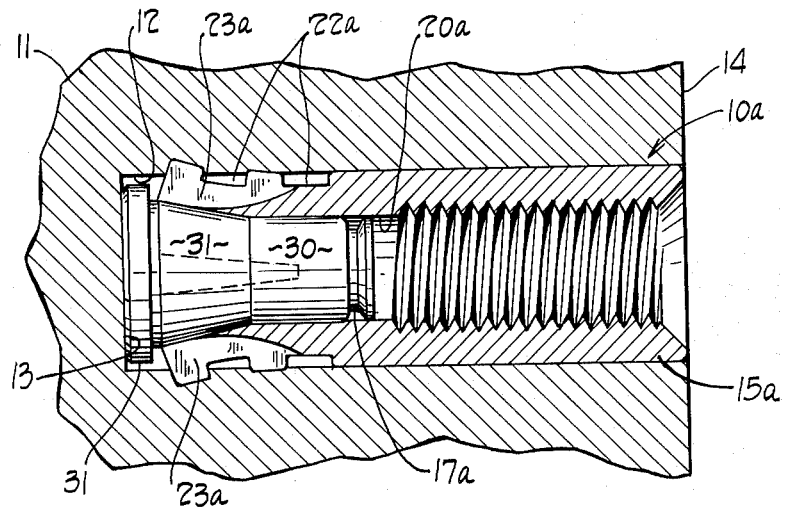

FIGURE 4 is a side elevation of the device, showing an alternate form of anvil configuration, with portions broken away and in section; and, FIGURE 5 is a horizontal, sectional, view of a blind hole in a masonry wall showing the expansion anchor illustrated in FIGURE 4 positioned therein with its anvil telescoped within the anchor body and the body expanded into locked engagement with the blind bore.

Figure 1:
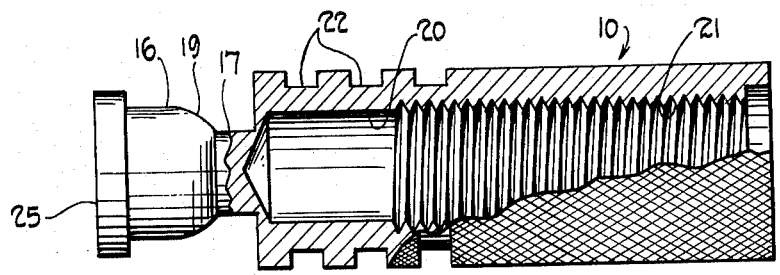
FIGURE 1 is a side elevation of the expansion anchor for bolts, that is the subject of this invention, with portions broken away and in section.

Referring more particularly to the drawing, there is seen in FIGURE 1 the unitary expansion anchor that is the subject of this invention, broadly indicated by reference numeral 10. The anchor 10 is preferably formed on an automatic screw machine from bar stock, and in its finished form comprises a single unit, requiring no further processing other than packaging in suitable containers. The diameter and length of the anchor 10 is dependent upon the size bolts, not shown, with which it is intended to be used and can be easily determined by persons skilled in the art.

The anchor 10 is divided into a shank portion 15 and an anvil portion 16, both separated from and joined to the shank portion through the neck 17. The shank 15 has a blind bore 20 therein centered on its longitudinal axis and threaded, as at 21, to receive a bolt. The diameter of the neck 17 is less than that of the bore 20. The depth of the shank bore 20 is calculated to be such that it stops just short of the junction of the neck 17 and shank 15, so that a frangible wall 18 is formed at the closed end of the blind bore 20. The thickness of the wall 18 is such that it will stand up under the ordinary handling the anchor will be subjected to prior to its intended use.

The diameter of the anvil 16 is less than that of the shank portion 15, but greater than that of the blind bore 20. The peripheral surface of the anvil 16 is joined to the neck 17 through a gradually curved surface 19, so as to facilitate the entrance of the anvil 16 into the shank bore 20, as explained hereinafter. Reference numeral 25 indicates a foot at the extreme end of the anvil, which acts as a bearing surface for the anvil. The face of the anvil 16 is knurled so that it presents a non-slip surface. The shank 15 has a plurality of spaced circular grooves 22, intersected by longitudinally extending slots 23, at its end adjacent the neck, for a purpose to be disclosed hereafter.

Figure 2:
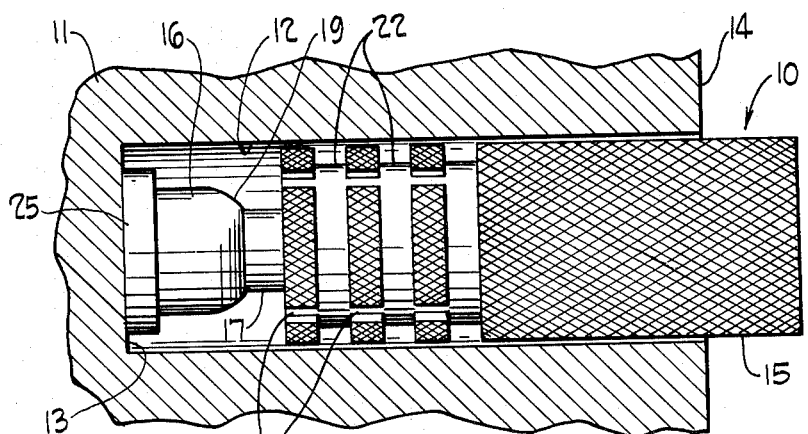
FIGURE 2 is a horizontal, sectional view of a blind hole in a masonry wall showing the expansion anchor positioned therein and still in its unitary condition, prior to expansion.
Figure 3:
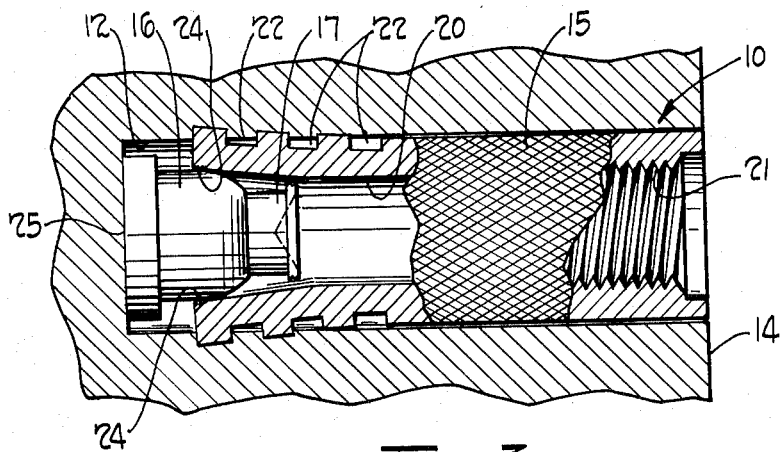
FIGURE 3 is a view similar to that of FIGURE 2, but showing the anchor anvil telescoped within the anchor body with the body expanded into locked engagement with the blind bore.

In its application as an anchor for a bolt, a pre-drilled blind bore 12 is formed in a concrete or masonry wall 11, as seen in FIGURES 2 and 3. The diameter of the hole 12 should be such that the anchor 10 will fit snugly therein, and the depth such that when the anchor anvil foot 25 is seated against the inner end 13 of the hole 12, the threaded end of the shank 15 will extend beyond the face of the wall 14, as seen in FIGURE 2, the same distance that it will be driven into the hole so as to be flush with the wall face 14, as seen in FIGURE 3, when it is in its expanded and locked condition. After the anchor is positioned in the hole 12, as shown in FIGURE 2, the protruding end of the shank 15 is struck a sharp blow with a hammer. This will cause the weakest part of the structure to fracture, namely the wall 18, and thereby separating the neck 17, with its attached anvil 16, from the shank 15, leaving a circular fracture ring 24 surrounding the now open inner end of the shank bore 20. At the same time the force of the initial, or following, hammer blows will move the shank over the neck 17, up the curved surface 19 and on to the anvil surface 16. The anvil being of greater diameter than the bore 20 causes the walls of the shank, weakened by the grooves and slots 22 and 23, to expand outwardly into wedged engagement with the walls of the hole 12. At the same time the ragged edges 24 of the remains of the fractured wall 18 become locked in the knurled surface of the anvil to further insure that the wedging action will be maintained.

At this point, as seen in FIGURE 3, the anchor 10 is firmly wedged in the hole 12, flush with the face 14 of the wall 11. A suitable bolt may now be inserted in the threaded bore 21 with the assurance that the anchor 10 cannot be pulled out. Furthermore, the bolt can be removed and reinserted repeatedly without affecting the holding power of the anchor threads 21.

An alternate type of anchor 10a is illustrated in FIGURES 4 and 5.

This anchor differs from that shown in FIGURES 1–3, in that it has an anvil portion 16a whose configuration is calculated to provide a positive lock between the telescoped anvil 16a and the shank 15a under conditions of continuous vibration such as encountered where the anchor 10a is used to hold motors and operating machinery in place.

The anvil 16a comprises a right-cylindrical plug 30 whose diameter is slightly larger than the inside diameter of the bore 20a, preferably 0.010" larger, and is adapted to engage the bore 20a in a drive fit. Reference numeral 31 indicates an outwardly tapered expander portion having its smallest diameter at the plug 30, and having a flat circular foot 32 at its large end, the diameter of the foot 32 being less than the outer diameter of the shank 15a, as shown most clearly in FIGURE 4.

The anvil unit 16a is both separated from and joined to the shank portion 15a through a cylindrical neck 17a, whose diameter is less than that of the shank bore 20a. The depth of the shank bore 20a is calculated to be such that it stops just short of the junction of the neck 17a and the shank 15a, so that a frangible wall 18a is formed at the closed end of the blind bore 20a.

Two spaced, annular, grooves 22a are located at the anvil end of the shank, as shown in FIGURE 4, and four, equally spaced, longitudinally extending arcuate slots 23a are cut in the shank wall and curve downward from the surface of the shank, at the second groove, to intersect the shank bore 20a at the frangible wall 18a, thereby cutting the frangible wall 18a at these points, to leave the neck 17a attached to the shank 15a through four fingers, defined by the slots 23a.

In use, the anchor 10a is positioned in a prepared wall bore 12, the same as anchor 10, and hammered into place in the same manner, to assume the condition illustrated in FIGURE 5.

The first hammer blow fractures the frangible, fingered, wall 18a, separating the anvil 16a from the shank 15a. Under subsequent hammer blows the shank bore 20a is driven over the plug 30 and on to the tapered expander 31, which expands the shank wall, which has been intentionally weakened by the grooves 22a and slots 23a, to assume the position shown in FIGURE 5, wherein the inner end of the shank is spread outwardly against the bore 12 in the wall 11.

It will be observed, by studying FIGURE 5, that when the shank 15a has been driven flush with the wall face 14 the plug 30 will be located in contact with the solid metal area of the shank wall, beyond the slots 23a. Thus the plug 30 is solidly and squarely locked in the bore 20a, while the tapered expander portion 31 may only make point contact with the expanded fingers of the shank. This point contact can also be observed in the embodiment 10, shown in FIGURE 3.

Such point contact is normal for all tapered, curved, or wedge shaped expander means, which are subject to breakdown at the narrow contact point under prolonged vibration, resulting in the loosening of the anchor in its wall bore, in time.

However, in this embodiment, the tapered expander portion 31 acts only to expand the shank, while the actual holding and locking action is brought about through the right-cylindrical plug 30, because of its drive fit in the shank bore 20a. No amount of vibration can loosen the plug 30 due to the wide contact area between the mating parts. Furthermore, the plug 30 can never be squeezed out of the end of the shank 15a, no matter how great or prolonged the vibration to which anchor 10a may be subjected.

It will now be clear that there has been provided a device which accomplishes the objectives heretofore set forth.

While the invention has been disclosed in a preferred and alternate form, it is to be understood that the specific embodiments thereof described and illustrated herein are not to be considered in a limited sense, as there may be other forms or modifications of the invention which should also be construed to come within the scope of the appended claim.

I claim:

A one-piece, blind hole, expansion anchor for bolts, comprising, an elongated cylindrical body having a shank end and an anvil end; the shank end having a blind bore therein centered on its longitudinal axis and threaded to receive a bolt; the anvil and shank ends being both separated and joined through a neck, of smaller diameter than the shank bore, extending from the anvil to a point just short of the inner end of the shank bore to define a frangible wall thereat; the anvil having a frusto-conical expander portion at its outer end and a right-cylindrical lock plug portion extending axially from the small diameter thereof to the neck, the diameter of the lock plug being slightly larger than that of the shank bore, whereby the lock plug is adapted to engage the shank bore and be secured therein through a drive fit; the shank also having a plurality of wall weakening annular grooves and longitudinally extending slots immediately adjacent the neck end thereof to facilitate the expansion of the inner end of the shank, whereby the application of axial force to the shank end of the body, when the anvil is seated in a blind hole will result in the fracturing of the frangible wall, thereby enabling the plug and expander to be driven into the bore of the shank to expand same and lock the anvil in its shank expanding position, through the plug.

References Cited by the Examiner

UNITED STATES PATENTS

| 2,120,577 | 6/1938 | Schulte | 85—75 |
| 3,065,661 | 11/1962 | Kolec et al. | 85—78 |
| 3,089,377 | 5/1963 | Engstrom | 85—72 |

FOREIGN PATENTS

| 944,090 | 6/1956 | Germany. |
| 570,735 | 7/1945 | Great Britain. |

EDWARD C. ALLEN, *Primary Examiner.*